April 26, 1938.  C. I. BAKER  2,115,453
WATER HEATING AND DEAERATING SYSTEM
Filed July 8, 1935
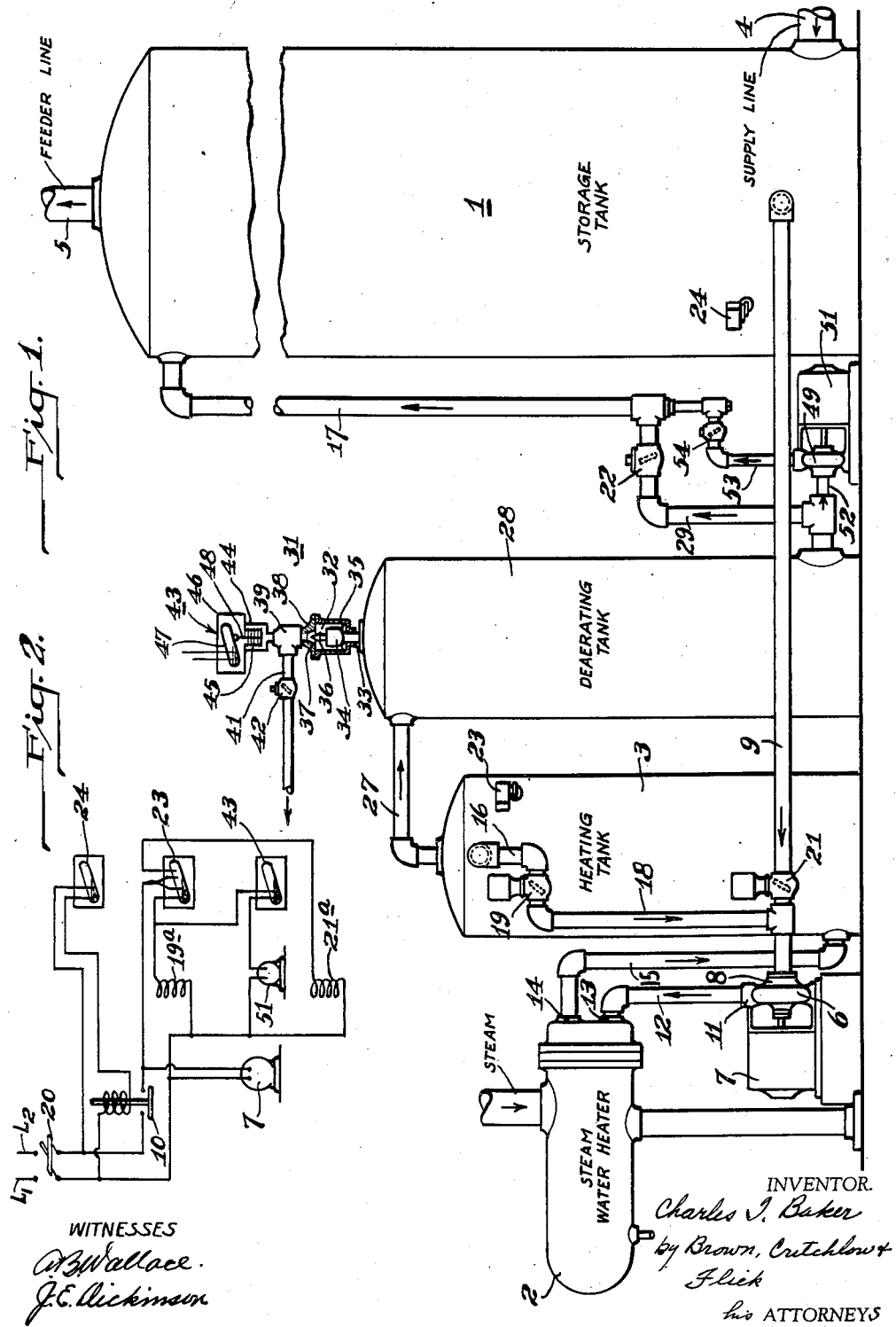
INVENTOR.
Charles I. Baker
by Brown, Critchlow &
Flick
his ATTORNEYS
WITNESSES
A. B. Wallace
J. E. Dickinson Patented Apr. 26, 1938

2,115,453

UNITED STATES PATENT OFFICE 2,115,453

WATER HEATING AND DEAERATING SYSTEM

Charles I. Baker, West Hickory, Pa.

Application July 8, 1935, Serial No. 30,258

9 Claims. (Cl. 183—2.5)

This invention relates to the deaerating or removal from the water circulated in water systems of the gases dissolved therein, and more particularly to the removal of the gases and especially oxygen dissolved in the water used in hot water systems.

It is well established that the corroding of the pipes, valves, storage tanks and other metal parts used in water systems is caused in the most part by the gases, and particularly the oxygen dissolved in the water coming in contact with such parts after they are liberated which they readily are, and especially where the water is circulated under varying pressures and subjected to heat.

It has also been found that the corrosive action occasioned by these dissolved gases is reduced, by the removal thereof, in about the same proportion that the free oxygen content of the water is itself reduced.

With these circumstances in mind it is the primary object of this invention to provide a simple and effective way of removing the dissolved gases, and especially the dissolved oxygen from the water circulated through a water system.

A more particular object, although the invention is not necessarily so limited, is to provide a simple and effective way of removing the oxygen and other gases dissolved in the water used in a hot water system and especially hot water systems of the unit volume heated storage type disclosed in United States Patent No. 1,441,201, granted to the present inventor January 9, 1923.

Another object is to utilize the auxiliary unit heating tank of a hot water storage system of the character referred to for deaerating or removing the dissolved gases from the water after it is heated and before it is delivered to the storage tank.

These and various other objects, as well as the other various novel features and advantages of the invention, will be apparent when the following detailed description is read in conjunction with the accompanying drawing, of which Fig. 1 is a schematic view of a hot water system of the type disclosed in United States Patent No. 1,441,201, modified in accordance with this invention; and Fig. 2 is a schematic wiring diagram of a control circuit for controlling the operation of the hot water heating system illustrated in Fig. 1.

Referring in detail to the drawing, a unit volume type of hot water system is illustrated which comprises a main storage tank 1 in which the water is stored after it is heated and from which it is dispensed. For heating the water in this tank a heater 2 is employed and although illustrated as an instantaneous steam type of heater it is to be understood that any other suitable heater may be used for such purpose. Between such heater 2 and the storage tank 1 a unit volume heating tank 3 is provided in which a unit volume of water is heated and then delivered to the top of a deaerating tank 28 by means of a pipe 27 and the bottom of such deaerating tank 28 is connected by means of a pipe 29 with the check valve 22 disposed in the pipe 17 which connects the deaerating tank 28 to the top of the storage tank 1.

The water supply for the system is furnished by a supply main 4 which is connected to the base of the storage tank 1 and in addition to supplying the water used in the system also provides the necessary pressure for dispensing the heated water from the top of the storage tank by way of its discharge outlet 5.

For circulating the water through the heater 2 and the unit heating tank 3 a pressure pump 6 equipped with a driving motor 7 is employed. The inlet 8 of such pump is connected by a pipe 9 to the supply main 4 or the base of the storage tank 1, as shown, and its outlet 11 connected by a pipe 12 to the inlet 13 of the heat exchange unit, not shown, of the heater. The outlet 14 of such unit is connected in turn by a pipe 15 to the base of the unit volume heating tank 3 while the top of the latter tank is connected by a pipe 16 and a pipe 18 to the pipe 9 which is connected between the storage tank 1 and the pump inlet.

To control the flow of the water while it is being heated an electromagnetically operated shut-off valve 19 is provided in the pipe 18 connecting the top of the unit volume heating tank 3 with the inlet pipe 9 connected to the pump 6 and a similar valve 21 is arranged in the latter pipe 9 between the storage tank 1 and the point where the unit volume heating tank outlet pipe 18 is connected to it. In addition, a check valve 22 is provided in the pipe 17 and, like the two other valves, it is of any well-known suitable construction.

In operating the system, after it is filled with water, the valve 21 in the pipe 9 connecting the circulating pump with the storage tank is closed and the valve 19 in the pipe 18 connecting the upper portion of the unit volume heating tank 3 with the pipe 9 is opened. At the same time the heater 2 and the motor 7 are set in operation. Under such conditions only the water in the heating tank is circulated through the heater and this circulation is continued until this water is all heated to a substantially uniform preselected temperature. The valve 19 is then closed and the valve 21 opened. This causes the pump to draw water from the storage tank and force the heated water from the heating tank through the pipe 27 into the top of the deaerating tank. As soon as the heated water is exhausted from the heating tank the valves 19 and 21 are again opened and closed respectively and the heating operation repeated.

To render the operation of the system automatic, an adjustable thermostatically-operated switch 23 is mounted on the heating tank 3 adjacent the top thereof with its thermal element, not shown, projecting into the tank and a similar switch 24 is similarly mounted at the base of the storage tank 1 somewhat above the point where the pipe 9 is connected to the tank 1 and the connection of the supply main 4. The latter of these switches, which is shown in Fig. 2 as a single-circuit mercury-type switch, although it may be any other suitable form of switch, is arranged to operate an electromagnetic switch 10 which connects the pump motor 7 to a suitable source of current supply $L_1$ and $L_2$ through a hand switch 20 when the water at the level of the switch 24 is below a preselected temperature and stops such motor when the tank is filled with water heated to the temperature selected. The other switch 23, which is a double-circuit mercury-type switch, is arranged, as shown, to energize the actuating coil 19a of the valve 19 and open such valve when the temperature of the water in the top of the heating tank 3 is below a temperature at which such switch is adjusted to operate and to break this circuit, closing such valve when the temperature exceeds the value selected and at the same time closing the circuit for the actuating coil 21a of valve 21 and opening the latter valve. Consequently if the whole system is filled with cold water and the control circuit is supplied with current the motor 7 will be started by the switch 24 and maintained in operation until the latter switch is opened, which it will be when the tank is filled with heated water down to such switch.

During the period when the water in the tank 1 is being heated the operation of the valves 19 and 21 is controlled by the switch 23 and in such a way that the water in the unit tank is heated to the temperature selected by the switch 23 and then delivered to the deaerating tank 1. At the same time it is refilled with cold water as previously described and these operations repeated until the switch 24 is operated to stop the pump motor 7 and deenergize the circuit to the switch 23.

In accordance with this invention provision is made for subjecting water in the heating tank to a pressure somewhat below atmospheric when it is being heated and deaerated, which is necessary to effect the greatest degree of deaeration, and for also preventing the loss of any of the water which has overflowed from the heating tank while the water is being heated.

The purpose of the deaerating tank 28 is to provide means for subjecting the water in the heating tank 3 to a pressure below atmospheric while it is being heated and for also catching the water which has overflowed from such heating tank when it is expanded, as well as provide a place where the heated water may be held in a quiet state for a period of time giving the gases a better opportunity to pass out of the water.

To permit the freed gases to escape and to also provide for maintaining a pressure below atmospheric in the deaerating tank 28, as well as prevent the escape of water from the deaerating tank with the freed gases, an outlet valve assembly, referred to generally by reference 31, is provided at the top of the deaerating tank. This assembly, as shown, comprises a float chamber 32 which is connected by a pipe 33 to the top of the deaerating tank 28, and a float 34 which is disposed in such chamber and spaced from the inlet of the pipe 33 by spaced bosses 35 which prevent the float closing the end of the pipe 33. At its top the float 34 is equipped with a valve 36 which is adapted to seat in a valve 37 formed in a fitting 38 secured to the top of the chamber 32 when the float is lifted by the water rising in the deaerating chamber.

The fitting 38 is also connected to a coupling T 39 which has an outlet pipe 41 carrying a check valve 42 of any suitable construction connected to one of its ports, and a vacuum-operated switch assembly 43 connected to its other port. As illustrated, this latter switch comprises a casing 44 which is connected to the T 39 and in which there is mounted a bellows-type of tube 45. The lower end of this tube 45 is enclosed and its upper end sealably connected to a switch housing 46. In the latter housing there is pivotally mounted a mercury switch 47 which is disposed for operation by a rod 48 connected between it and the bottom of the bellows tube 45.

For producing a vacuum in the deaerating tank 28 a pressure pump 49 operated by a driving motor 51 is employed. The inlet of this pump is connected by a pipe 52 to the deaerating tank end of the pipe 29 and its outlet by a pipe 53 in which there is arranged a check valve 54 to the pipe 17 at the storage tank side of the main check valve 22. When the system is in operation this pump 49 is actuated while the water is being heated in the heating tank 3 to pump water from the deaerating tank into the storage tank and thereby produce in the heating and deaerating tanks a pressure lower than atmospheric. To automatically control the operation of such pump the vacuum-operated switch 43 is provided, and, as shown in Fig. 2, is arranged to energize the pump motor 51 whenever the pressure in the deaerating tank exceeds a preselected value determined by the bellows tube 45.

With the energization of the control circuit, if the water in the unit tank is cold, valve 21 is closed, valve 19 opened, and the motor 7 set in motion. At the same time the pump 49 is operated by the switch 43 until the desired low pressure is established in the deaerating tank 28. When water in the heating tank is sufficiently heated the switch 23 reverses the operation of the valves 19 and 21 and stops motor 51, and the heated water is pumped into the deaerating tank which is somewhat larger than the heating tank. When this is taking place the gases in the top of the deaerating tank are forced out of the discharge, or escape, pipe 41 until the deaerating tank is filled and the water rises in the float chamber 32 and causes the float valve 36 to close. When this occurs the water in the bottom of the deaerating tank is forced by way of pipes 29 and 17 into the storage tank.

After the heating tank is unloaded the switch 23 reverses, and the pump 49 is again set in motion and operated until the desired low pressure is again established in the deaerating tank. When this occurs there will still be a goodly quantity of water in the deaerating tank which remains quiet until the next heating tank load is heated and during such period the gases in this quiet water rise to the top of the deaerating tank. As soon as the water in the storage tank is heated down to the level of the switch 24 it causes such switch to open and in opening it breaks the circuit to switch 10, which in turn stops the operation of the heating and deaerating apparatus until the switch 24 is again closed by the cooling or using of the heated water in the storage tank.

As will be readily appreciated from the foregoing, the best known ways of removing dissolved gases from liquids are made use of namely by increasing the temperature and decreasing the pressure. When set free the dissolved gases appear in the form of bubbles which are so small that they are usually entrained with the moving water under the usual city or water supply pressures. However, in this system by reason of the pressure being reduced to below atmospheric, as it is in the unit heating tank 3, these bubbles become enlarged and readily rise to the top of the tank. Furthermore, the intense turbulence given to the water by the circulating pump 6 mechanically coalesces the smaller bubbles into larger ones which also expedites their movement to the top of the tank from which the gases, so moved, are forced into the deaerating tank.

As will be appreciated by those skilled in the art, the invention may be practiced in various other ways than described and such is contemplated by the appended claims.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A water-heating and deaerating system comprising, a main storage tank, a small heating tank connected to said storage tank, a water heater having its outlet connected to the lower part of said heating tank, a pump having its outlet connected to the inlet of said heater and its inlet connected to both the upper part of the heating and the lower part of said storage tank, means for selectively causing said pump to either circulate the water in said heating tank through said heater or draw water from said storage tank and thereby displace the water in said heating tank, means for creating a partial vacuum in the heating tank while the water therein is being circulated through the heater, and means for collecting the gases dissolved in the water which are released while the water is being heated and discharging them when discharging the heated water from the heating tank.

2. In a water-heating and deaerating system, a deaerating tank, a heating tank connected at its top to the top of said deaerating tank, a heater having its outlet connected to the bottom of said heating tank, a pump having its outlet connected to the inlet of said heater and its inlet connected to both the top of the heating tank and to a source of water supply, means for selectively closing the connections between said pump and said heating tank and water supply, means for creating a partial vacuum in said deaerating tank, and means for disposing of the gases removed from the water in said heating tank when said water is discharged into said deaerating tank.

3. A water-heating and deaerating system comprising, a storage tank, a deaerating tank having a gas-escape outlet at the top thereof equipped with a check valve, means connecting the bottom of said deaerating tank with the top of said storage tank, a check valve in said latter means for shutting off any back flow from said storage tank to the deaerating tank, means for creating a partial vacuum in said deaerating tank, a heating tank having its top connected to the top of said deaerating tank, a water heater having its outlet connected to the bottom of said heating tank, a circulating pump having its outlet connected to the inlet of said heater and its inlet connected to the top of said heating tank and to a source of water supply, and means for selectively closing the connections between the pump and said water supply and said heating tank.

4. In a water-heating and deaerating system, a heating tank for holding a unit volume of water while it is being heated to a preselected temperature, means for subjecting the water therein during the heating period to a pressure not greater than atmospheric pressure, a second tank for receiving the heated water as it is discharged from said heating tank and holding it quiet under a pressure not greater than atmospheric while another unit volume of water is being heated in the heating tank, a third tank connected to the second for storing the water after it is discharged thereinto from said second tank, means for heating the water in said heating tank, and means for forcing the water from one tank to another.

5. In a water heating system, a heating tank for holding a unit volume of water while it is being heated to a preselected temperature, a deaerating tank disposed to receive the water when it is discharged from said heating tank, and holding it quiet to permit the gases therein to escape while the succeeding volume of water in the heating tank is being heated, means for maintaining a pressure in said heating and deaerating tank not greater than atmospheric pressure, a storage tank disposed to receive the water discharged from said deaerating tank, means for heating the water in said heating tank, means for forcing the water into the heating tank and from the heating tank into the deaerating tank and from the deaerating tank into the storage tank, and means for permitting the gases collected in the deaerating tank to escape when the water in the heating tank is forced into the deaerating tank.

6. In a water heating and deaerating system, a unit heating tank in which the water is stored while it is being heated to a preselected temperature, a deaerating tank connected to said heating tank to receive the water discharged therefrom and hold it under a pressure not greater than atmospheric pressure for a period after it is discharged from the heating tank, means for subjecting said deaerating tank and said heating tank to a pressure not greater than atmospheric pressure, means for permitting the gases collected in said deaerating tank to escape when the water in the heating tank is discharged into the deaerating tank, and means for preventing any of the water in the deaerating tank escaping with said gases.

7. A water-heating and deaerating system comprising, a storage tank, having a source of water supply under pressure connected to the bottom thereof, a water heater for heating the water of the storage tank, a heating tank for storing a unit volume of water while it is being heated connected at its bottom to the outlet of said heater, a circulating pump having its outlet connected to the inlet of said heater and its inlet connected to both the bottom of said storage tank and the top of said heating tank, means for selectively closing the connections between said pump and said storage tank and heating tank, a deaerating tank connected at its top to the top of said heating tank and at its bottom through a check valve to said storage tank, a pressure pump connected between the bottom of said deaerating tank through a check valve with the top of said storage tank, means for operating said latter pump to create a low pressure in said deaerating tank, means for permitting the gases collected in said deaerating tank to escape when the heated water in said heating tank is discharged into said deaerating tank, and means for shutting off the gas escape outlet of said deaerating tank when the deaerating tank is filled with water.

8. A deaerating water heater comprising, a storage tank, a smaller deaerating tank connected to said storage tank, a still smaller heating tank connected to said deaerating tank, means for permitting gases to escape from the deaerating tank, means for creating a partial vacuum in the deaerating tank, means for heating to a selected temperature water contained in the heating tank, means for delivering water from the bottom of the storage tank to the bottom of the heating tank to thereby discharge the heated water from the top of the heating tank to the top of the deaerating tank whereby forcing gases from the deaerating tank to the atmosphere and water from the bottom of the deaerating tank to the top of the storage tank.

9. A deaerating water heater comprising, a storage tank, a smaller deaerating tank connected to said storage tank, a still smaller heating tank connected to said deaerating tank, means for permitting gases to escape from the top of the deaerating tank, means for obtaining a pressure in the deaerating and heating tanks less than the pressure in the storage tank, means for heating to a predetermined temperature water contained in the heating tank, means for delivering water from the bottom of the storage tank to the bottom of the heating tank to thereby discharge the heated water from the top of the heating tank to the top of the deaerating tank and force the gases from the top of the deaerating tank to the atmosphere and the water from the bottom of the deaerating tank to the top of the storage tank.

CHARLES I. BAKER.